United States Patent Office 3,552,190
Patented Jan. 5, 1971

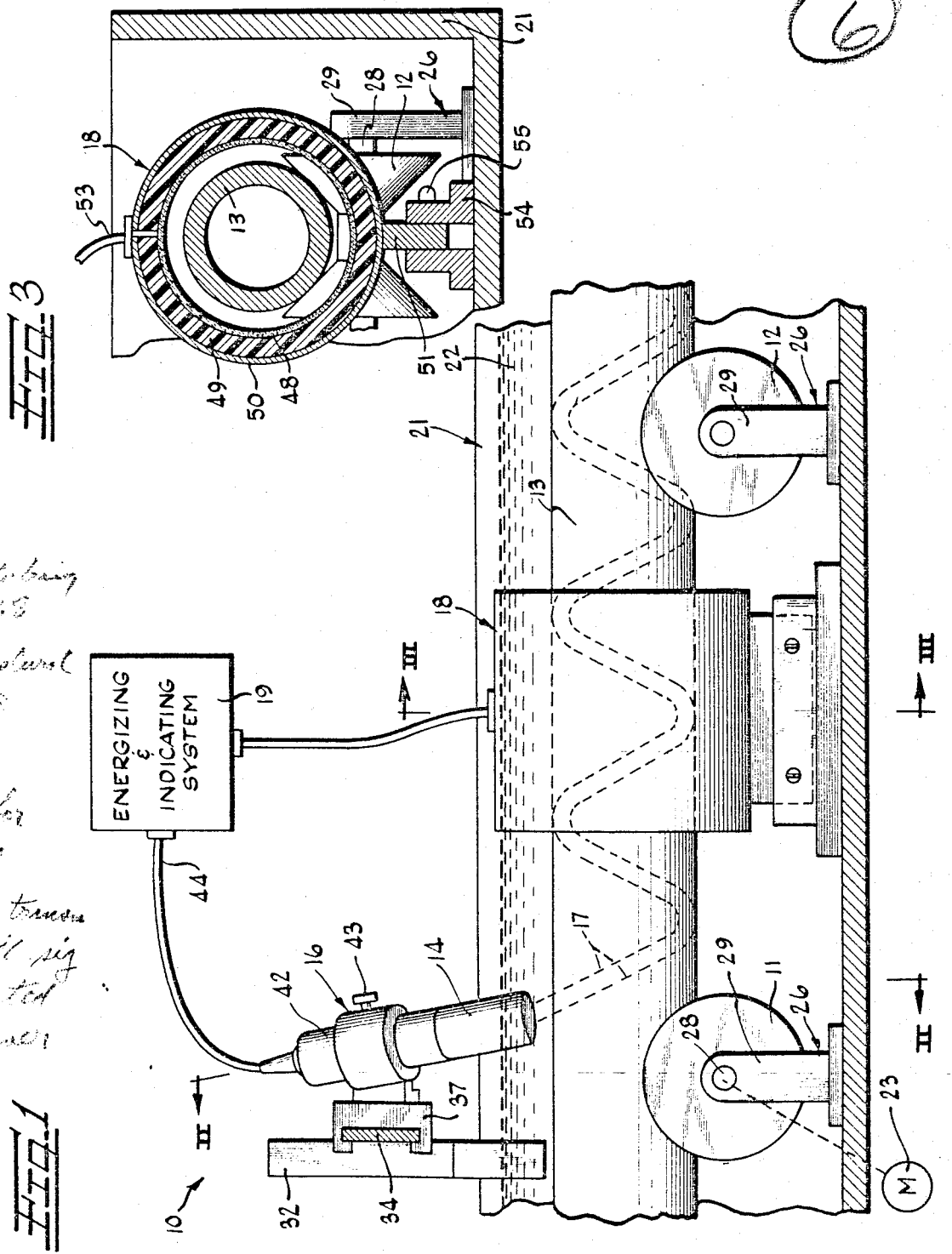

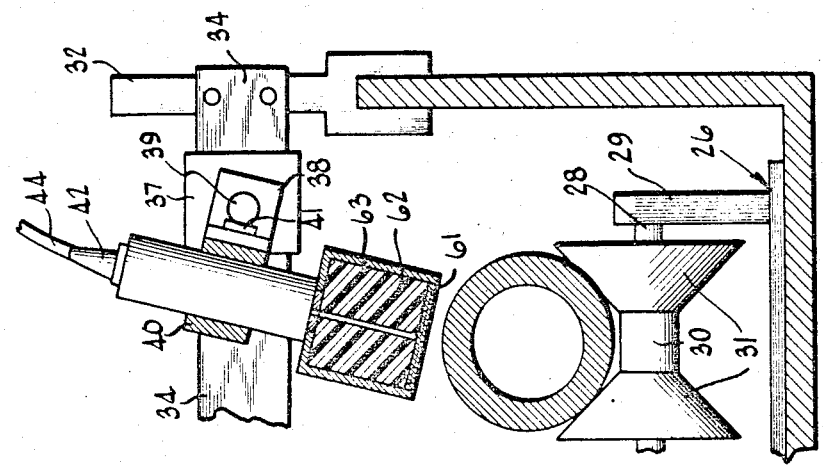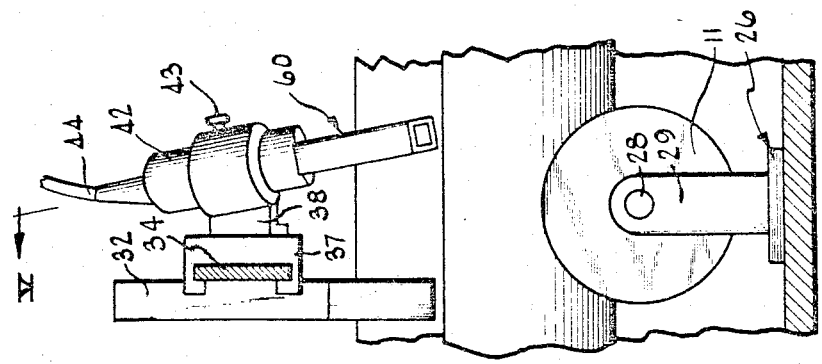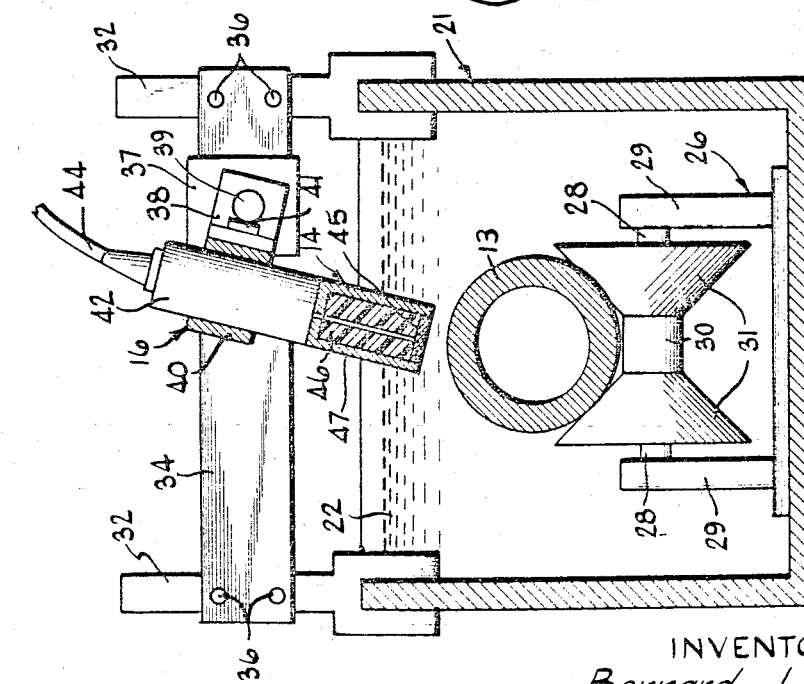

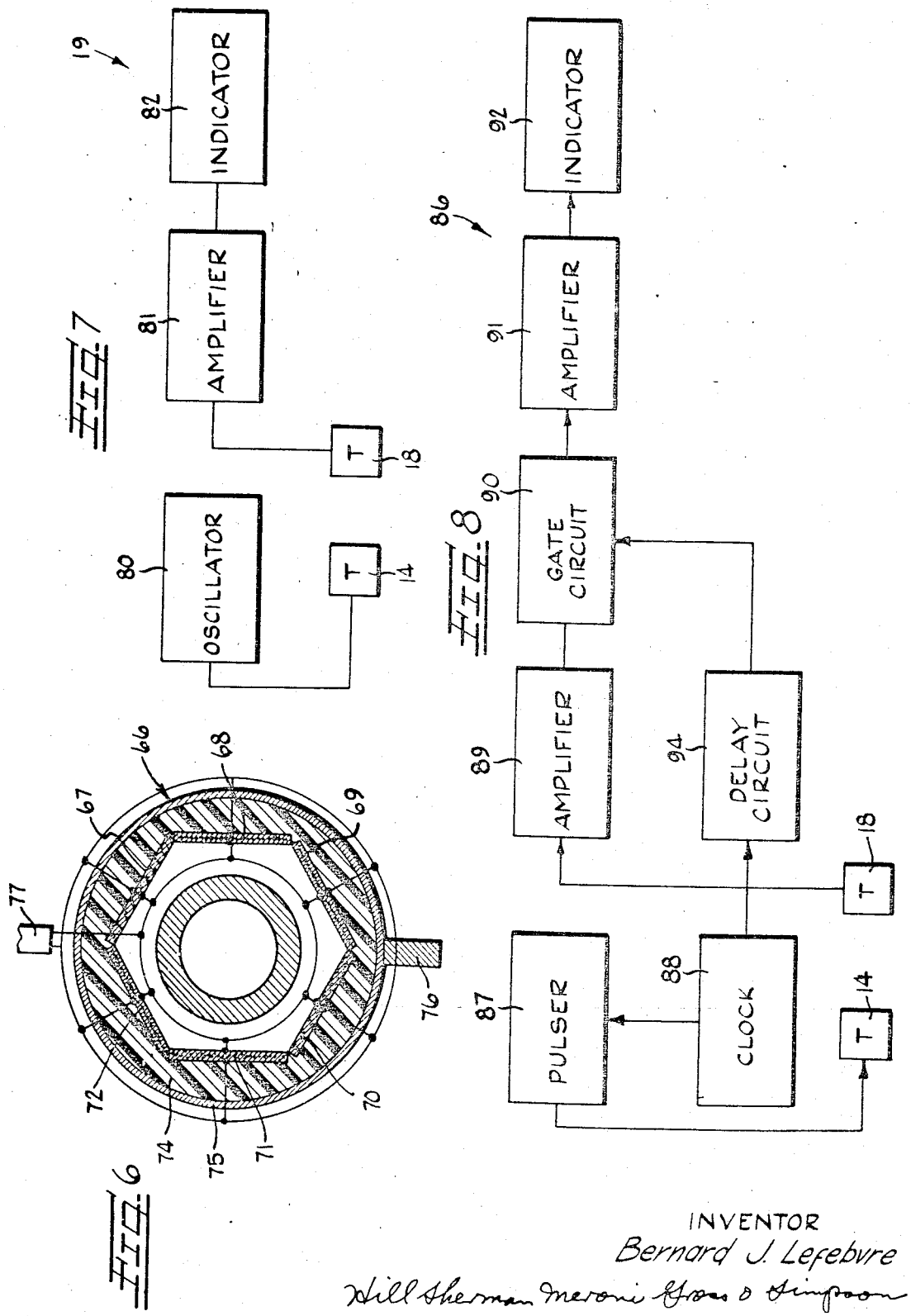

3,552,190
ACOUSTIC TESTING SYSTEM FOR ELONGATED OBJECTS
Bernard J. Lefebvre, Roselle, Ill., assignor to Magnaflux Corporation, Chicago, Ill., a corporation of Delaware
Filed July 11, 1967, Ser. No. 652,592
Int. Cl. G01n 29/04
U.S. Cl. 73—67.7                    13 Claims

ABSTRACT OF THE DISCLOSURE

Testing apparatus in which energy is transmitted along an elongated object to be reflected by inhomogeneities transversely out of the object to receiving means. Preferably, ultrasonic energy is transmitted into the object at an angle such that it impinges upon substantially the entire cross-section and most preferably, the angle is such that the energy travels in a generally helical path. The receiving means comprises either a plurality of transducers in angularly spaced relation around the object, or a cylindrical transducer encircling the object.

---

This invention relates to an acoustic testing system and more particularly to an acoustic testing system for inspecting elongated objects which permits the object to be inspected throughout its length for internal defects in a highly efficient and reliable manner. The system permits the inspection of an elongated object at extremely high rates of speed without detracting from the sensitivity and accuracy of the inspection.

Systems have heretofore been proposed for inspecting elongated objects for flaws therein but such systems have been very slow in operation, have been incapable of detecting defects in all portions of the object and have involved the use of complicated and expensive equipment for performing the testing operation and for handling the object.

This invention was evolved with the general object of overcoming the disadvantages of prior systems and of providing an acoustic testing system for tubes, bars and other elongated objects, wherein the rate at which the objects may be inspected is greatly increased, without increasing the complexity of mechanical handling equipment.

A further object of the invention is to provide an acoustic testing system which is highly reliable, fast and effective in operation, while being relatively simple and inexpensive in construction.

According to this invention, an acoustic testing system is provided wherein acoustic energy is transmitted along an elongated object to be reflected out of the object in various directions transverse to the object by inhomogeneities therein, with receiving means being arranged for receiving the energy reflected transversely out of the object in the various directions.

With this arrangement, it is possible to determine the existence of inhomogeneities in a cross-sectional portion of the object without any scanning movement of a testing assembly relative to the object. In accordance with a specific feature of the invention, means are provided for effecting longitudinal movement of the object relative to the testing assembly without any rotation of the object relative to the testing assembly. Thus it is possible to move the object through the testing assembly at an extremely high rate of speed.

In accordance with a further feature of the invention, the transmitting and receiving means are in spaced relation along the object, preferably with the receiving means being in generally encircling relation to the object. In one preferred embodiment of the invention, the receiving means comprises a cylindrical transducer encircling a portion of the object and having an acoustically sensitive internal cylindrical surface in facing relation to the outer surface of the portion of the object which is encircled. In another preferred embodiment, the receiving means comprises a plurality of transducers in angularly spaced relation around a portion of the object. With the encircling arrangement, it is possible to test an entire cross-sectional portion of the object, without any rotation of the object and without any spinning probe arrangement or the like.

A further feature of the invention relates to the transmission of energy into the object at an angle such as to cause energy to travel in a path such that through refractions and reflections the energy impinges upon substantially the entire cross-section of the object. With an elongated body the energy may also travel longitudinally and with a hollow cylindrical object, the energy can travel in a helical path. With elongated objects having rectangular, hexagonal or other non-circular cross-sections, the energy cannot travel in a true helical path, but can travel in what may be described as a generally helical path, such that it impinges upon substantially the entire cross-section while travelling longitudinally. Preferably, the receiving means has an axial dimension at least as long as the axial length of one convolution of the generally helical path.

In one preferred energizing and indicating system, a continuous AC voltage is applied to the transmitting transducer to cause transmission of continuous acoustic waves through the object, with the receiving transducer being connected to indicating means to provide a continuous indication. With no interruption in the transmission of the energy, it is possible to test at extremely high rates of speed and yet obtain an indication of any inhomogeneities within the object.

In another preferred energizing and indicating system, the transmitting transducer is pulsed to cause transmission of bursts of ultrasonic energy along the object and the receiving transducer is preferably coupled to indicating means through a gate circuit which is operated in synchronism with the pulsing of the transmitting transducer. This arrangement is advantageous in permitting use of standard pulse-echo type equipment and in obtaining high instantaneous power in the transmitted energy. With a high repetition rate, it is possible to test at extremely high rates of speed.

Still another feature of the invention relates to the provision of a transmitting transducer having a relatively large dimension transverse to the object, to insure transmission of energy along a helical path and to accommodate variations in the positioning of the transducer relative to the object. Preferably, the transmitting transducer may be rectangular, although other configurations are possible.

This invention contemplates other objects, features and advantages which will become more fully apparent from the following detailed description taken in conjunction with the accompanying drawings which illustrate preferred embodiments and in which:

FIG. 1 is a diagrammatic side elevational view of an acoustic testing system constructed according to the principles of this invention;

FIG. 2 is a cross-sectional view taken substantially along line II—II of FIG. 1, and showing the arrangement of a transmitting transducer relative to an object;

FIG. 3 is a cross-sectional view taken substantially along line III—III of FIG. 1, and showing the construction of one preferred form of receiving transducer;

FIG. 4 is a cross-sectional view similar to the left-hand portion of FIG. 1, showing a modified form of transmitting transducer;

FIG. 5 is a sectional view taken substantially along line V—V of FIG. 4;

FIG. 6 is a cross-sectional view similar to FIG. 3, but showing a modified form of receiving transducer;

FIG. 7 is a schematic block diagram showing one preferred form of energizing and indicating system; and FIG. 8 is a schematic block diagram showing another preferred form of energizing and indicating system.

Reference numeral 10 generally designates an acoustic testing system constructed in accordance with the principles of this invention. In general, the system 10 comprises a pair of rollers 11 and 12 for supporting an elongated object 13 for testing and for longitudinal movement, the illustrated object 13 being in the form of a long cylindrical pipe.

An ultrasonic transmitting transducer 14 is supported by a support structure 16 and is arranged to transmit ultrasonic energy into the pipe 13 at an angle such as to cause the energy to travel in a helical path around and along the pipe 13, as diagrammatically indicated by dotted lines 17 in FIG. 1.

With a pipe or other object of uniform cross-section and of a homogeneous material, the transmission of the ultrasonic energy is confined within the pipe 13. However, it is found that with any flaws, defects or other inhomogeneities within the pipe, a portion of the energy will be reflected out of the pipe, in a direction dependent upon the location of the inhomogeneity. In accordance with this invention, a receiving transducer 18 is provided which is arranged for receiving energy reflected transversely out of the object in various directions. In the embodiment of FIG. 1, the transducer 18 is cylindrical and encircles a portion of the pipe 13, to receive any ultrasonic energy reflected from within the portion of the pipe 13 which is encircled.

The transmitting and receiving transducers 14 and 18 are connected to an energizing and indicating system 19 which energizes the transmitting transducer 14 and which indicates the existence of flaws within the portion of the pipe disposed within the receiving transducer 18.

To provide an efficient acoustic coupling between the transmitting transducer 14 and the pipe 13 and between the pipe 13 and the receiving transducer 18, the pipe 13, together with the supporting rollers 11 and 12, and the transmitting and receiving transducers 14 and 18 are disposed within a tank 21 to be immersed in a liquid 22 which may be water or any other liquid which efficiently transmits acoustic waves, while permitting movement of the pipe 13.

To effect longitudinal movement of the pipe 13, an electric motor 23 may be mechanically coupled to the roller 11, as diagrammatically illustrated. The direction of movement is generally not important, and the pipe may be either pushed or pulled, or both.

An important advantage of the system of this invention is that an entire cross-section of the pipe 13 may be tested without requiring rotation of either the pipe or of the testing means. Thus in a single longitudinal movement of the pipe 13 through the assembly, the entire pipe may be tested.

The manner in which the energy is propagated along the pipe 13 depends upon the configuration of the transmitting transducer 14 and the positioning thereof relative to the pipe 13, as well as the dimensions of the pipe 13. Both longitudinal and shear waves and also surface and other types of waves may be generated, depending upon the angle at which the energy is impinged on the surface of the pipe 13. It is possible to confine the energy to shear waves principally by confining the energy from the transducer 14 into a narrow beam and by using an angle between the axis of the beam and the surface of the pipe which is greater than the critical angle above which no longitudinal waves are transmitted, but less than the critical angle above which no shear waves are generated. Even under such conditions, it is difficult to avoid some generation of longitudinal or other types of waves and usually the energy is propagated in a complex manner. At the same time, however, the energy does travel in helical paths and uniform testing of an entire cross-sectional portion of the pipe 13 can be accomplished, using the principles of this invention. It is also possible to test rods or other solid elongated objects, and although best results are generally obtained with an object which is cylindrical, it is possible to test objects having rectangular, hexagonal or other cross-sectional shapes. In any case, it is desirable that the energy should impinge upon substantially the entire cross-section of the object and with elongated objects that the energy should travel in a generally helical path, i.e. a path in which it travels longitudinally while impinging upon substantially the entire cross-section.

To insure that an entire cross-sectional portion of the pipe 13 will be tested, the effective longitudinal dimension of the receiving transducer 18 is preferably at least equal to the axial length of one convolution of the normal helical path of travel of the energy, whether in the form of longitudinal, shear or another type of wave.

To support the illustrated rollers 11 and 12, stands 26 are provided which are secured to a lower wall 27 of the tank 21, with shaft portions 28 of the rollers being journalled in upright portions 29 of the stands 26. The rollers 11 and 12 may preferably be formed with small diameter central portions 30 and frusto-conical end portions 31, to maintain the pipe 13 in a centered position.

The stand 16 which supports the transmitting transducer 14 comprises a pair of posts 32 secured to the upper edges of side walls 33 of the tank 21, with a horizontal plate 34 extending transversely between the posts 32. The plate 34 is secured to the posts 32 by bolts 36 which are adjustable to permit adjustment of the vertical position of the transducer 14. A carrier 37 is slidable on the plate 34 and a support member 38 is secured to the carrier 37 by means of a screw 39, which may be loosened and tightened to permit adjustment and fixing of the angular position of the support member 38. A sleeve member 40 is secured to the support member 38 by means of a screw 41 which may be loosened and tightened to permit adjustment and fixing of the angular position of the sleeve member 40. A support tube 42 is slidable in the sleeve member 40 and its position may be fixed by tightening of a screw 43. At its lower end, the tube 42 carries the transducer 14, and the upper end thereof is connected through a cable 44 to the energizing and indicating system 19, as diagrammatically illustrated in FIG. 1.

The illustrated transducer 14 comprises a circular transducer 45 which has a front face for transmitting ultrasonic waves toward the pipe 13 and which has a back face secured to a backing member 46 within a cylindrical housing 47 secured to the tube 42.

With this arrangement, a beam of ultrasonic waves can be transmitted toward the pipe 13, to enter the surface of the pipe at an angle such as to cause the ultrasonic waves to travel in a helical path around the pipe 13, as indicated by dotted lines 17 in FIG. 1.

FIG. 3 shows one preferred form of transducer, it being understood that other forms may be used. The illustrated receiving transducer 18 comprises a cylindrical transducer element 48 having an inside cylindrical surface in spaced facing relation to the outer surface of the pipe 13 and having an outer cylindrical surface secured to an inner cylindrical surface of a cylindrical backing member 49 which is secured within a cylindrical casing 50, supported from the bottom wall 27 of the tank 21 through a suitable support 51. Electrodes are provided on the inner and outer surfaces of the transducer element 48, which are connected through a cable 53 to the energizing and indicating system 19. The transducer element 48 is arranged to generate electrical signals in response to radial deformation thereof, produced in response to ultrasonic waves transmitted radially outwardly from within the pipe 13.

The support 51 for the casing 50 may preferably be vertically adjustable in a support member 54 secured to the lower wall 27 of the tank 21, with a locking screw 55 being provided for fixing the vertical position, so as to permit accurate centering of the transducer 18 relative to the pipe 13.

Referring now to FIGS. 4 and 5, a modified transmitting transducer 60 is illustrated which includes an oblong rectangular transducer plate 61 having a front face for transmitting ultrasonic waves toward the pipe 13 and having a rear face secured to a backing member 62 within a casing 63, secured to the lower end of the support tube 42. The long dimension of the rectangular transducer plate 61 is preferably in a plane in transverse relation to the axis of the pipe 13, but at an angle such as to permit transmission of the energy in a generally helical path. With this arrangement at least a substantial portion of the ultrasonic energy is transmitted into the pipe 13 at an angle such as to insure transmission of the energy in a helical path, and the arrangement will accommodate substantial variations in the positioning of the pipe 13 relative to the transducer. It will be appreciated that other transducer configurations may be used in place of the rectangular transducer plate 61 of FIGS. 4 and 5, or in place of the circular transducer element 45 of FIGS. 1 and 2.

FIG. 6 illustrates a modified receiving transducer 66 which comprises six transducer plates 67–72 secured to inner hexagonally-arranged planar faces of a backing member 74 which is disposed within a casing 75. The casing 75 may be secured to a support 76 which may be inserted in the support 54 to be supported from the lower wall 27 of the tank 21. As diagrammatically illustrated, electrodes on the inner and outer faces of the transducer plates 67–72 are secured together and through a cable 77 to the energizing and indicating system 19.

The transducer 66 operates in the same manner as the transducer 18. Ultrasonic energy reflected radially outwardly from the pipe 13 from inhomogeneities therein is impinged on one or more of the transducer plates 67–72 to generate signals which are applied through the cable 77 to the energizing and indicating system 19.

Referring now to FIG. 7, the energizing and indicating system 19 may comprise an oscillator 80 connected to the transducer 14, to supply a continuous AC signal thereto. The frequency of operation is not critical but by way of example, the frequency of operation may be in the range of from 0.5 to 50 megacycles. Excellent results can be obtained with standard ultrasonic frequencies of 2.25 and 5 megacycles. The receiving transducer 18 is connected to the input of an amplifier 81 having an output connected to suitable indicating means 82. The indicating means 82 may be in the form of a meter, an oscilloscope, or other display apparatus, or an audible device may be energized when a flaw is detected. Also, the system can be used to energize suitable marking means.

It will be appreciated that either one or both of the modified transmitting and receiving transducers 60 and 66 may be connected to the oscillator 80 and the amplifier 81, in place of the transmitting and receiving transducers 14 and 18.

Referring now to FIG. 8, a modified energizing and indicating system 86 is shown which comprises a pulser 87 periodically energized by signals from a clock 88 to apply pulses to the transmitting transducer 14. The receiving transducer 18 is connected to the input of an amplifier 89 having an output connected through a gate circuit 90 to the input of an amplifier 91 having an output connected to an indicator 92. The gate circuit 90 is operated in response to a signal applied from a delay circuit 94, connected to the clock circuit 88. The delay circuit 94 operates to enable the gate circuit 90 to pass signals for a certain time interval after pulsing of the transducer 14, corresponding to the time interval required for the ultrasonic energy to travel from the transmitting transducer 14 to the receiving transducer 18.

In the operation of this system, it is important that the pulser 87 be operated at a rate sufficiently high to insure the detection of defects even with the pipe 13 moved through the assembly at a rapid rate. By way of example, the pulser 87 may be operated at a rate of 5000 pulses per second.

An important advantage of the invention arises from the fact that very little energy escapes from the pipe 13 except where an inhomogeneity exists therein so that the noise level of operation of the receiving transducer is very low and high gain amplification may be used. The positioning and dimensions of the elements are not critical except that, as above noted, the length of the receiving transducer 18 should preferably be at least as great as the axial length of one complete convolution of the helical path of transmission of the energy. Thus an inhomogeneity existing at any part of the pipe must cause reflection of energy radially outwardly to the receiving transducer, regardless of the speed of movement of the pipe.

I claim as my invention:

1. In an apparatus for testing an elongated generally tubular object, an acoustic testing assembly comprising transmitting means arranged for transmitting ultrasonic waves into said object at an angle such that by successive reflections between inner and outer walls of said object, said waves travel in a generally helical path and such that upon relative axial movement of said transmitting means and said object substantially the entire object is subjected to said waves, and receiving means arranged for extending around at least a portion of the circumference of said object to receive from a plurality of different directions and to detect defects appearing in different locations circumferentially.

2. In apparatus as defined in claim 1, means for effecting longitudinal movement of said object relative to said testing assembly without rotation of said object relative to said testing assembly.

3. In apparatus as defined in claim 1, said transmitting means being in axially spaced relation to said receiving means.

4. In apparatus as defined in claim 1, said receiving means comprising a plurality of transducers in angularly spaced relation around a portion of said object.

5. In apparatus as defined in claim 1, said receiving means comprising transducer means in generally encircling relation about a portion of said object.

6. In apparatus as defined in claim 5, said receiving means comprising a generally cylindrical transducer encircling a portion of said object and having an acoustically sensitive internal cylindrical surface in spaced facing relation to the outer surface of the portion of the object encircled.

7. In apparatus as defined in claim 1, said transmitting means comprising an ultrasonic transducer arranged to transmit a beam of ultrasonic waves into the outer surface of said object along an axis spaced from the axis of the object and at a substantial angle with respect to a plane transverse to the axis of said object to effect transmission of ultrasonic energy in said generally helical path in said object.

8. In apparatus as defined in claim 7, said receiving means comprising transducer means in encircling relation to a portion of said object and arranged to receive energy reflected radially outwardly from any inhomogeneity in said portion of said object, and means for effecting longitudinal movement of said object relative to said testing assembly.

9. In apparatus as defined in claim 7, said transducer including a wave-transmitting surface facing said object and having a dimension in a direction transverse to said object which is relatively large as compared to the transverse dimension of said object.

10. In apparatus as defined in claim 7, said angle being such that complex acoustic shear waves are induced in said object.

11. In apparatus as defined in claim 7, said transmitting means including means for applying a continuous AC voltage to said transducer.

12. In apparatus as defined in claim 7, said transmitting means including means for pulsing said transducer to cause transmission of bursts of ultrasonic energy into said object.

13. In apparatus as defined in claim 12, said receiving means including receiving transducer means, indicating means, means including gate means for applying signals from said receiving transducer means to said indicating means, and means for operating said gate means in synchronism with the pulsing of said ultrasonic transducer.

References Cited

UNITED STATES PATENTS

| 2,562,449 | 7/1951 | De Lano, Jr. | 73—67.9 |
| 2,628,335 | 2/1953 | Drake | 73—67.7X |
| 3,135,109 | 6/1964 | Werner | 73—67.8 |
| 3,289,468 | 12/1966 | Van der Veer et al. | 73—71.5 |
| 3,299,694 | 12/1967 | Dickenson III | 73—67.5 |
| 3,332,278 | 7/1967 | Wood et al. | 73—67.7 |

FOREIGN PATENTS

| 1,306,285 | 9/1962 | France | 73—67.7 |

RICHARD C. QUEISSER, Primary Examiner

J. P. BEAUCHAMP, Assistant Examiner